US009031981B1

(12) United States Patent
Potter et al.

(10) Patent No.: US 9,031,981 B1
(45) Date of Patent: May 12, 2015

(54) SEARCH AROUND VISUAL QUERIES

(71) Applicant: Palantir Technologies, Inc., Palo Alto, CA (US)

(72) Inventors: Jordan Potter, San Francisco, CA (US); Nir Ackner, Palo Alto, CA (US); David Cohen, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/767,779

(22) Filed: Feb. 14, 2013

Related U.S. Application Data

(63) Continuation of application No. 13/608,864, filed on Sep. 10, 2012.

(51) Int. Cl.
G06F 17/30 (2006.01)
(52) U.S. Cl.
CPC .... *G06F 17/30398* (2013.01); *G06F 17/30277* (2013.01)
(58) Field of Classification Search
CPC ............... G06F 17/30398; G06F 17/30277
See application file for complete search history.

(56) References Cited

U.S. PATENT DOCUMENTS

| 5,418,950 | A | * | 5/1995 | Li et al. ...................... 715/781 |
| 5,428,737 | A | * | 6/1995 | Li et al. ...................... 1/1 |
| 5,428,776 | A | * | 6/1995 | Rothfield ................... 1/1 |
| 5,608,899 | A | * | 3/1997 | Li et al. ...................... 1/1 |
| 5,701,456 | A | * | 12/1997 | Jacopi et al. ............... 1/1 |
| 5,911,138 | A | * | 6/1999 | Li et al. ...................... 1/1 |
| 6,208,985 | B1 | * | 3/2001 | Krehel ........................ 707/767 |
| 7,610,290 | B2 | * | 10/2009 | Kruy et al. ................. 1/1 |
| 7,979,424 | B2 | * | 7/2011 | Dettinger et al. .......... 707/718 |
| 2004/0103088 | A1 | * | 5/2004 | Cragun et al. ............. 707/3 |
| 2004/0239674 | A1 | * | 12/2004 | Ewald et al. ............... 345/440 |
| 2005/0004911 | A1 | * | 1/2005 | Goldberg et al. .......... 707/7 |
| 2005/0278286 | A1 | * | 12/2005 | Djugash et al. ............ 707/1 |
| 2006/0004740 | A1 | * | 1/2006 | Dettinger et al. .......... 707/4 |
| 2006/0074967 | A1 | * | 4/2006 | Shaburov .................. 707/102 |
| 2007/0005582 | A1 | * | 1/2007 | Navratil et al. ............ 707/4 |
| 2007/0027851 | A1 | * | 2/2007 | Kruy et al. ................. 707/3 |
| 2007/0192281 | A1 | * | 8/2007 | Cradick et al. ............ 707/2 |

(Continued)

OTHER PUBLICATIONS

Russell, et al., NITELIGHT: A Graphical Tool for Semantic Query Construction. University of Southhampton. 2008.*

(Continued)

*Primary Examiner* — Neveen Abel Jalil
*Assistant Examiner* — Kristofer Biskeborn
(74) *Attorney, Agent, or Firm* — Hickman Palermo Becker Bingham LLP

(57) ABSTRACT

A method and apparatus for a data analysis system for analyzing data object collections is provided. The data analysis system includes one or more graphical user interfaces comprising various interface elements that enable users to create visual queries. A visual query is constructed as a graph representing a pattern of interest in a collection of data objects. A visual query may include one or more graph elements and property information associated with the specified graph elements. After a user has constructed a visual query, the system may transform the visual query into a query template. A query engine may then execute the query template to search a data object collection for data object results corresponding to the specified pattern. The search for instances of a specified pattern in a collection of data objects is referred herein to as a "search around."

16 Claims, 9 Drawing Sheets

(56) References Cited

U.S. PATENT DOCUMENTS

| | | | |
|---|---|---|---|
| 2007/0260582 A1* | 11/2007 | Liang | 707/2 |
| 2008/0201313 A1* | 8/2008 | Dettinger et al. | 707/4 |
| 2008/0215543 A1* | 9/2008 | Huang et al. | 707/3 |
| 2009/0083275 A1* | 3/2009 | Jacob et al. | 707/10 |
| 2009/0094217 A1* | 4/2009 | Dettinger et al. | 707/4 |
| 2009/0187556 A1* | 7/2009 | Ross et al. | 707/5 |
| 2010/0161646 A1* | 6/2010 | Ceballos et al. | 707/769 |
| 2010/0169376 A1* | 7/2010 | Chu | 707/780 |
| 2011/0035396 A1* | 2/2011 | Merz et al. | 707/759 |
| 2011/0093490 A1* | 4/2011 | Schindlauer et al. | 707/769 |
| 2014/0074888 A1 | 3/2014 | Potter et al. | |

OTHER PUBLICATIONS

Mendes, TcruziKB: Enabling Complex Queries for Genomic Data Exploration, IEEE 2008.*

Smart, et al., A Visual Approach to Semantic Query Design Using a Web-Based Graphical Query Designer, Springer 2008.*

* cited by examiner

SEARCH AROUND VISUAL QUERIES

CROSS-REFERENCE TO RELATED APPLICATIONS

Benefit Claim

This application claims the benefit as a Continuation of application Ser. No. 13/608,864, filed Sep. 10, 2012, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to the techniques for exploring large data sets using visual queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysts and other computer users often interact and request data from computer-based databases containing large collections of data objects. In many instances, the data objects stored in such databases include information from disparate sources and may represent a variety of real-world information. In order to analyze large and varied collections of data objects, analysts often desire to find patterns of interest based on particular relationships exhibited between the data objects. For example, given a database containing a large number of interrelated data objects representing individuals, merchants, financial institutions, and payment transactions, an analyst may desire all instances of data objects corresponding to a particular set of individuals making a payment to a merchant using a particular bank account.

In order to find patterns of interest in a data object collection stored in a database, analysts may formulate queries that correspond to desired data object patterns. However, formulating queries that represent data object patterns presents a number of challenges. For example, accurately specifying a query that may represent a number of relationships between data objects and properties of those data objects is often a cumbersome and error-prone task. Further, while an analyst may intuitively understand the data object relationships required to express a desired data object pattern, the analyst may not always be fluent in a query language required to specify the pattern to a query engine. What is needed is an intuitive mechanism for data analysts and other computer users to formulate queries of arbitrary complexity representing patterns over collections of data objects.

DETAILED DESCRIPTION

Figure 1:
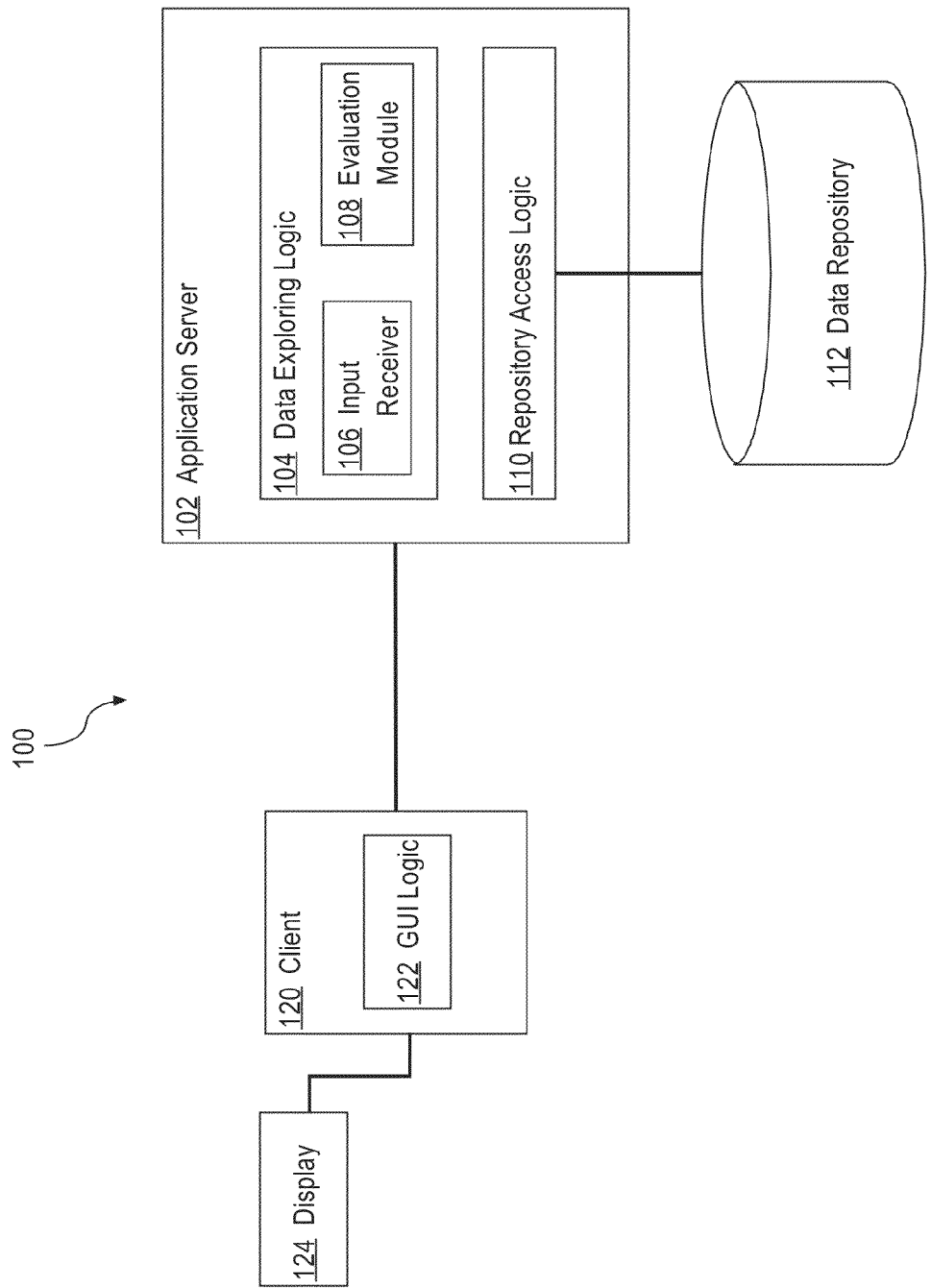
FIG. 1 illustrates an example data analysis system for exploring a universe of data items.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Search Around Basics
   2.2 Search Around Visual Queries
      2.2.1 Data Objects
      2.2.2 Data Object Properties
      2.2.3 Data Object Links
         2.2.3.1 Data Object Link Types
         2.2.3.2 Data Object Intermediaries
         2.2.3.3 Property Matches
         2.2.3.4 Link Strength
      2.2.4 Branching Conditions
      2.2.5 Optional and Required Stages
      2.2.6 Blank Graph Elements
      2.2.7 Transforming a Visual Query
3.0 Implementation Mechanisms—Hardware Overview

1.0 General Overview

According to some embodiments, systems and methods facilitate the formulation of queries on data object collections. In an embodiment, a user may use one or more graphical user interfaces to create a visual representation of a query and use the visually represented query to query a data object collection and retrieve instances of a data object pattern corresponding to the query. In an embodiment, a data analysis system is enabled to transform a visually represented query into a query format suitable for execution by a data object query engine. Visual representations of queries may use nodes, symbols and properties to indicate aspects or attributes of queries.

In an embodiment, a data object may represent any collection of information as part of a data object model. For example, a data object model representing information about a particular company may include data objects corresponding to employees, organizational units, inventory items, purchase orders, etc. A data object may be associated with a data object type (e.g., employee, inventory item, etc.) and may additionally include one or more data object properties (e.g., first name, cost, etc.). A data object type and any associated properties define a particular data object within a data object collection. For example, an employee at a company named "Bob Smith" may be represented in a data object collection with a data object of type Employee and with property information specifying the name "Bob Smith." Furthermore, a data object collection may include information that defines relationships, or data object links, between data objects in the collection. In an embodiment, in the context of a data object collection, a pattern represents a structured collection of data object types, data object link types, and property values associated with the data object types and data object links.

In an embodiment, a query that is used to search for instances of a particular data object pattern comprises a textual representation of the pattern. The query may be specified in a query template that is executed by a query engine. Execution of a query template may return one or more result instances, wherein each result instance includes a set of data objects and data object links corresponding to the pattern specified by the query in the query template. In an embodiment, a pattern also may be visually represented as a graph that includes one or more graph nodes and graph edges representing the data object types and link types of a pattern, respectively.

In an embodiment, a data analysis system uses one or more graphical user interfaces comprising various interface elements that enable users to create visual queries as graphs that represent a data object pattern. The system may transform the graph into a query template based at least on the one or more graph nodes and one or more graph edges included in the graph. A query engine may execute a query template to search a data object collection for result instances corresponding to the specified pattern. The search for instances of a specified pattern in a collection of data objects is referred to herein as a "search around."

2.0 Structural and Functional Overview

FIG. 1 illustrates an example data analysis system for exploring a collection of data objects. Data analysis system 100 comprises application server 102 and one or more clients, such as client 120.

Figure 4:
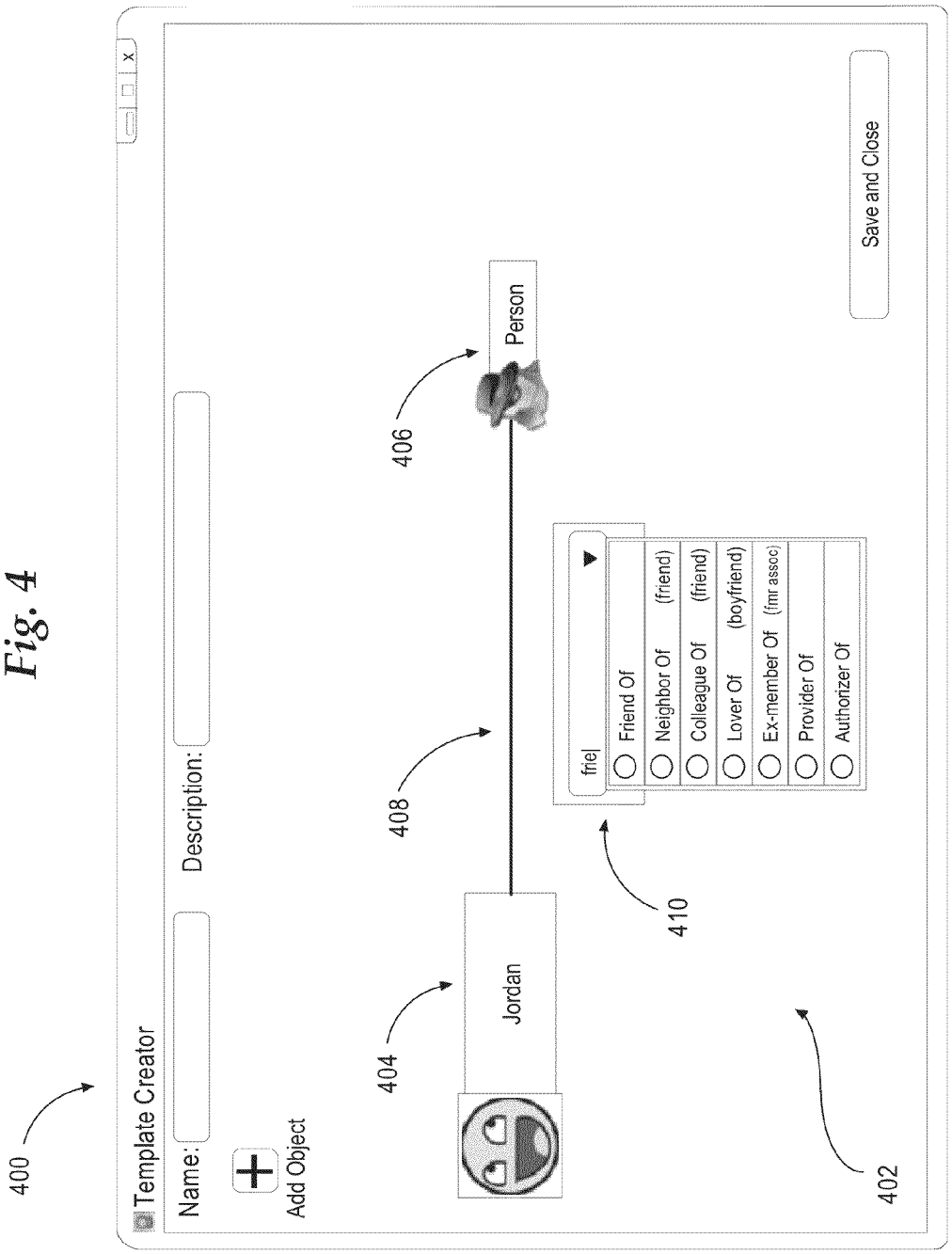
FIG. 4 illustrates an example graphical user interface related to specifying graph edge properties.

In the embodiment illustrated in FIG. 1, client 120, which may be implemented by one or more first physical computing devices, is communicatively connected to application server 102, which may be implemented by one or more second physical computing devices, over a network. In some embodiments, each such physical computing device may be implemented as a separate computer system as shown in FIG. 4. For example, client 120 may be implemented in a computer system as a set of program instructions recorded on a machine-readable storage medium, while application server 102 may be implemented in a different computer system. Client 120 comprises graphical user interface (GUI) logic 122. GUI logic 122 may be a set of program instructions which, when executed by one or more processors of the computer system, are operable to receive user input and to display a graphical representation of one or more graphic constructs related to constructing visual queries and exploring a collection of data objects using the approaches herein. GUI logic 122 may be operable to receive user input from, and display the graphic constructs to, a graphical user interface that is provided on display 124 by the computer system on which client 120 executes.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to explore the universe of data items according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g. memory, CPU time) that have been allocated for executing the program instructions.

In an embodiment, application server 102 comprises repository access logic 110 and data exploring logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In the embodiment illustrated in FIG. 1, data exploring logic 104 comprises input receiver 106 and evaluation module 108. Data exploring logic 104 may be object-oriented logic. As used herein, the universe of data items can be accessed and/or operated by the data exploring logic 104 to create, modify, delete, and store the data generated or used by data analysis system 100.

In an embodiment, input receiver 106 is a set of program instructions which, when executed by one or more processors, are operable to receive input from a client.

Evaluation module 108 is a set of program instructions that implement logic to create, modify, delete and store objects that are associated with the universe of data items, evaluate these objects when instructed to do so by data analysis system 100, provide the evaluation results to a client. Evaluation results of one or more objects may also be rendered by GUI logic 122 on display 124.

2.1 Search Around Basics

In an embodiment, a query engine that executes a query template specifying a data object pattern is referred to herein as a search around engine. In general, a search around enables a user to find instances of data objects that exhibit particular relationships to other data objects in a data object collection.

A search around query may be specified in a query template. In an embodiment, a query template is a structured text document comprising a tree structure including an initial data object type as a root object in the tree and various other specified data object types and data object links branching from the root object. For example, a query template may be defined in an Extensible Markup Language (XML) file with XML elements representing the specified data object types and data object links. The document tree structure additionally includes any property information associated with the data object types and data object links. Each level in a query template tree represents a data object link level from an initial data object type in the pattern and is referred to herein as a search around "stage."

In an embodiment, execution of a query template proceeds by processing a data object search defined by each stage in the template until all stages have been processed, with the data object results from each stage being used as the initial data objects for any existing child stages. The process of executing a query template may include further transformation of the defined data object searches into one or more underlying database operations such as, for example, Structured Query Language (SQL) operations. After performing the search defined by each stage of a query template, a search around engine may return one or more results. Each result returned by a search around is referred to herein as an "instance," and includes a collection of data objects and data object links that satisfy the search conditions at each stage in the query template. Thus, the result of a search around on a particular data object collection is the union of all instances of a pattern specified by the query template. In an embodiment, each search around result instance may be represented visually by a graph that displays the particular data objects and data object links for the particular instance arranged according to the specified pattern.

For example, given a data object collection that includes data object types representing individuals (e.g., Person data objects) and data object links representing phone calls initiated between individuals, a user may specify a simple pattern corresponding to instances of any person initiating a call to any other person. The example pattern may be specified in a query template by defining two Person data object types and a data object link representing the initiation of a phone call associated with the two Person data object types. The example pattern includes only a single stage, represented by the link between the two Person data object types.

The execution of a query template corresponding to the example pattern may result in zero or more instances of data objects and data object links that are connected as specified by the pattern in a data object collection. For example, assuming the data object collection includes data object information representing an individual named John making a phone call to an individual named David, one result instance may include a first Person data object representing the individual named John, a second Person data object representing the individual named David, and a data object link representing a phone call initiated between John and David. The result instance may be displayed visually to a user as a graph that includes nodes for Person data objects representing John and David, respectively, and a graph edge connecting the two Person data objects.

2.2 Search Around Visual Queries

For the purposes of clearly illustrating how the functions described herein operate upon the construction of visual queries, the following sections describe example graphical user interface displays. However, the graphical user interface displays described herein represent only selected examples of visualizations for the visual query manipulation operations and query transformations that are described herein. Thus, the disclosure broadly encompasses any method of creating and transforming the visual queries that are described herein.

Further, no particular graphical user interface is required and the disclosure is intended to encompass the visual query creation processes and transformations that are described independent of any graphical user interface, and it is not intended to be limited to any particular graphical user interface or other form of display. For example, each example graphical user interface merely represents one way to receive input from a user to create the graph elements and graph properties that are shown in the graphical user interfaces, and represents only one way to display output resulting from the visual query creation and transformation processes described herein; in other embodiments, programmatic methods may be used to obtain the same graph elements and properties and other forms of data output may be used such as logging, reporting, storing in database tables, storing in spreadsheets, or out using the graphical user interface of another program or process.

In an embodiment, a data object pattern may be visually represented by a graph that includes one or more graph nodes and graph edges. The graph nodes and graph edges represent data object types and data object links of a pattern, respectively. In an embodiment, a user creates a visual query as a graph by using one or more graphical user interfaces that enable the user to add, remove, and modify the particular graph nodes, graph edges, and properties included in the graph in order to specify a desired pattern of interest.

One of several mechanisms may be used to initiate the creation of a visual query. In one embodiment, a user may select a user interface option indicating the creation of a new graph, resulting in the display of a graphical user interface without pre-existing graph elements on the display. In another embodiment, a user may identify a pre-existing graph pattern generated as a result of another search around or other system operation. For example, a user may select a graph or a portion of a graph displayed as search around result instance generated by the execution of another visual query. The selected graph or graph portion may serve as a starting point for the design of a new visual query.

Figure 2A:
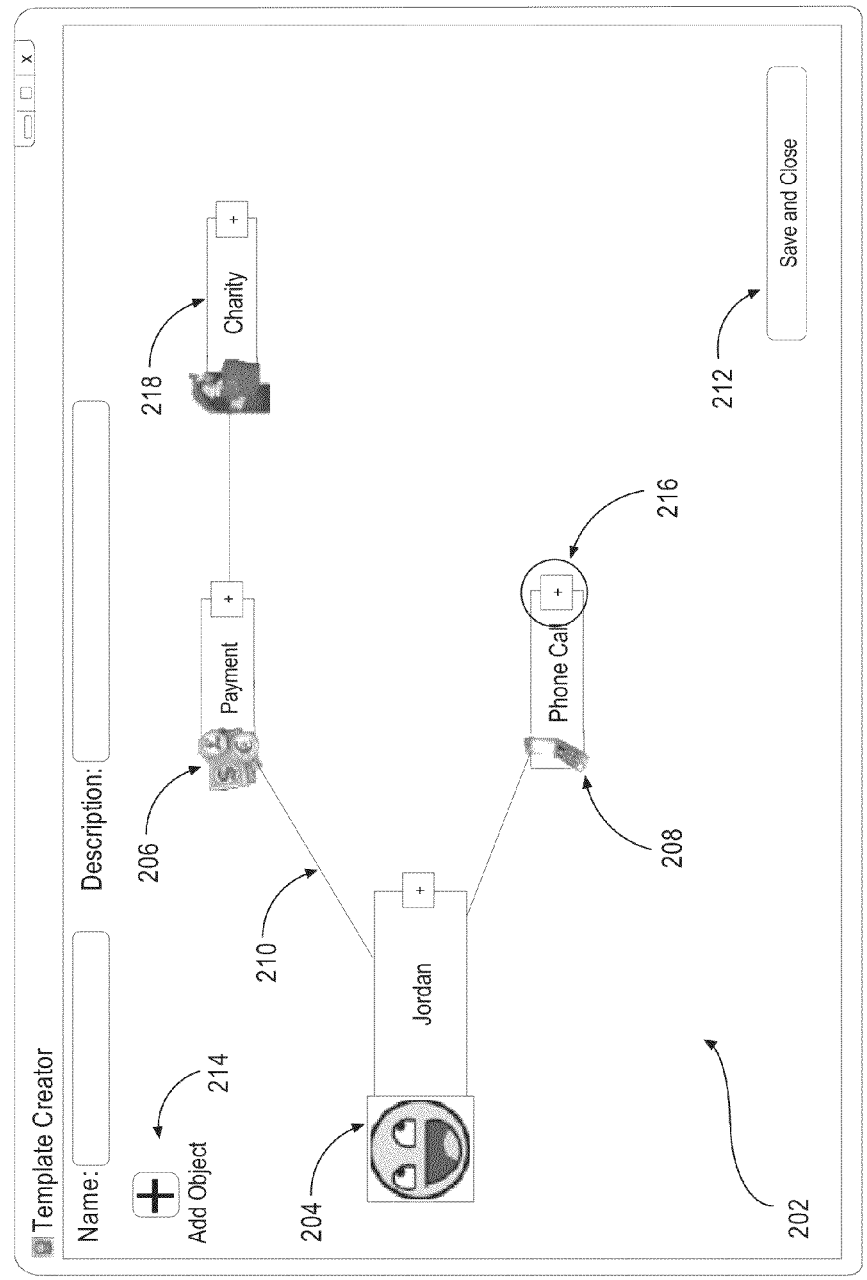
FIG. 2A illustrates an example graphical user interface related to adding graph nodes to a visual query.

FIG. 2A illustrates an example graphical user interface display 200 enabling a user to create and modify a visual query. The graphical user interface display includes an example pattern visually represented by graph 202, illustrating a visual query under construction. Graph 202 includes several graph elements including multiple graph nodes and graph edges. For example, the current state of graph 202 includes four graph nodes: graph node 204, graph node 206, graph node 208, and graph node 218. Each of the graph nodes in graph 202 is connected to one or more other graph nodes by one or more graph edges. For example, graph node 204 is connected to graph node 206 by graph edge 210.

As described above, each of the depicted graph nodes in graph 202 represents a data object type and each of graph edges represents a data object link between data object types. For example, graph node 204 represents a Person data object type as indicated by the graphic displayed in conjunction with the graph node. Similarly, graph node 206 represents a Payment data object type, and graph node 208 represents a Phone Call data object type. Each of the data object types and data object link types associated with the displayed graph node and graph edges indicates a data object type or data object link type that would be specified in a query template generated for the visual query represented by graph 202.

As further described below, graph edges, such as the example graph edge 210 in FIG. 2A, may indicate operators to be used in queries, such as Boolean operators. For example, the presence of two graph edges 210 as shown in FIG. 2A may signify that a search query should search for node 204 with a Boolean OR relationship to node 206 or node 208. When an OR relationship is present, the graph may be transformed into multiple queries; for example, one query might indicate a search for nodes 204, 206 and a second query might indicate a search for nodes 204, 208 to implement the OR relationship. In other embodiments, graphical attributes, icons, symbols, colors or other elements may indicate different kinds of operators or relationships.

2.2.1 Adding Graph Elements

In an embodiment, a user may add one or more graph elements to a visual query graph by using any number of interface elements including a selection of a button displayed the graphical user interface, drop-down menu selections, clicking on the interface with an input device, input device gestures, etc. For example, interface element 214 illustrates an example graphical interface button enabling a user to add a new graph node. In one embodiment, in response to a user selecting interface element 214, a new graph node or other graph element is added into an available space on the graphical user interface display 200. In an embodiment, after a graph node is added, a user may manually position the newly added graph node onto a desired area of graphical interface 200 by, for example, dragging the graph node around the display using an input device. In an embodiment, in response to a user selecting interface element 214 to add a new graph element, the user may be prompted to specify additional information about a newly added graph node, for example, the specification of an associated data object type and data object properties with the newly added graph node.

In an embodiment, graph nodes displayed as part of a graph may comprise an interface element enabling users to create one or more additional graph nodes. For example, graph node 208 is illustrated comprising interface element 216 representing an interface element enabling a user to add one or more additional graph node to graph 202. In an embodiment, the addition of a graph node using an interface element that is associated with an existing graph node, such as interface element 216, may indicate an automatic association of the new graph node with the existing graph node. For example, the selection of interface element 216 may create a new graph node on graphical interface 200 in close proximity to graph node 208. In an embodiment, the addition of a graph node using an interface element such as interface element 216 may also include the automatic addition of a graph edge between the existing graph node and the newly created graph node.

Figure 2B:
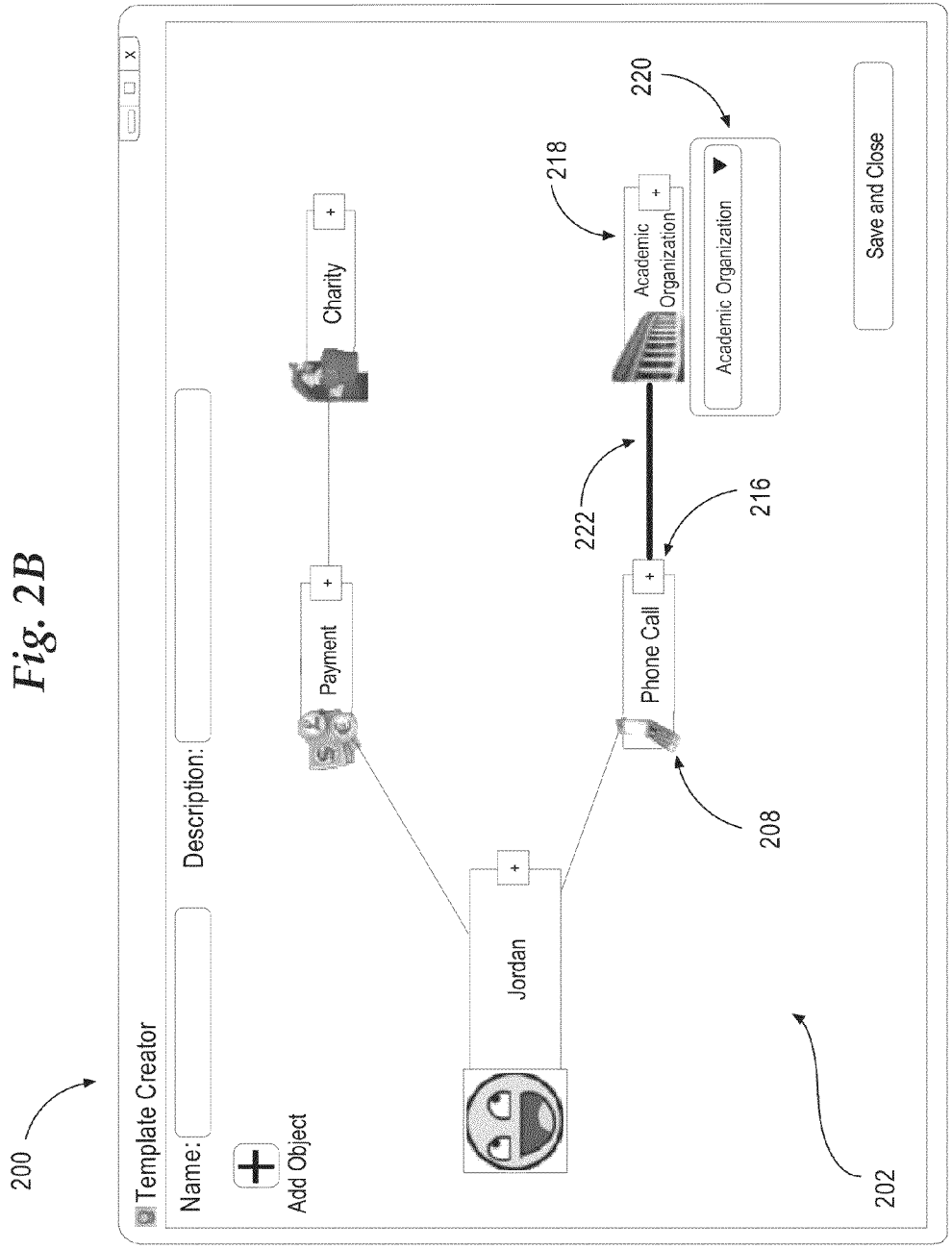
FIG. 2B illustrates an example graphical user interface related to adding graph nodes to a visual query.

FIG. 2B illustrates the example graphical user interface 200 after the selection of interface element 216 to add a new graph node. As illustrated in FIG. 2B, graph 202 includes new graph node 218 generated in response to a user selection of interface element 216. Graphical interface 200 additionally comprises interface element 220 enabling a user to select an initial data object type associated with new graph node 218. For example, the current selection of interface element 220 indicates that new graph node 218 is associated with an Academic Organization data object type. A user may modify the data object type associated with graph node 218, for example, by selecting a different data object type using interface element 220. In an embodiment, the selection of a particular data object type associated with a particular graph node determines the graphic display of the particular graph node. For example, graph node 218 currently displays a picture of a building and the text "Academic Organization" to indicate that graph node 218 represents an Academic Organization data object type.

FIG. 2B additionally includes new graph edge 222 representing a data object link between graph node 208 and new graph node 218. As described above, graph edge 222 may be automatically generated in response to a user adding graph node 218, or may also be manually added by the user using any other interface element.

In an embodiment, a list of selectable data object types associated with a graph node may be presented to a user in an interface element such as interface element 220. A list of selectable data object types for a particular graph node may be refined in number of ways. For example, the list of selectable data object types may be refined by examining the current state of the graph and presenting only data object type options that are relevant to current graph state. For example, if a user adds a new graph node that is connected by a graph edge to another graph node representing a Payment data object type, then the selectable data object types presented for the new graph node may include only those data object types that have an association with any Payment data object type in a data object collection under examination. For example, in a particular data object collection, Payment data objects may be associated only with Person data objects and Merchant data objects, resulting in the display of those two data object types in a list associated with a new graph node connected to a Payment data object type. Filtering the data object types selectable by a user to only those found in a data object collection may assist a user in defining a pattern that will return at least one result instance.

2.2.2 Data Object Properties

Data object types represented by graph nodes in a visual query may additionally comprise one or more data object properties. Each data object property may be associated with one or more property values. For example, a Person data object type represented by a graph node may include one or more data object properties (e.g., an age, gender, and occupation), and a user may specify values for the properties (e.g, "38," "male," and "insurance agent"). Age, gender, and occupation as referenced herein are identified only as clear examples; other properties for nodes may be used as appropriate for particular applications. In an embodiment, data object property values specified in a visual query further refine the result instances returned by the query to those instances that include data objects having the specified data object property values.

Figure 3:
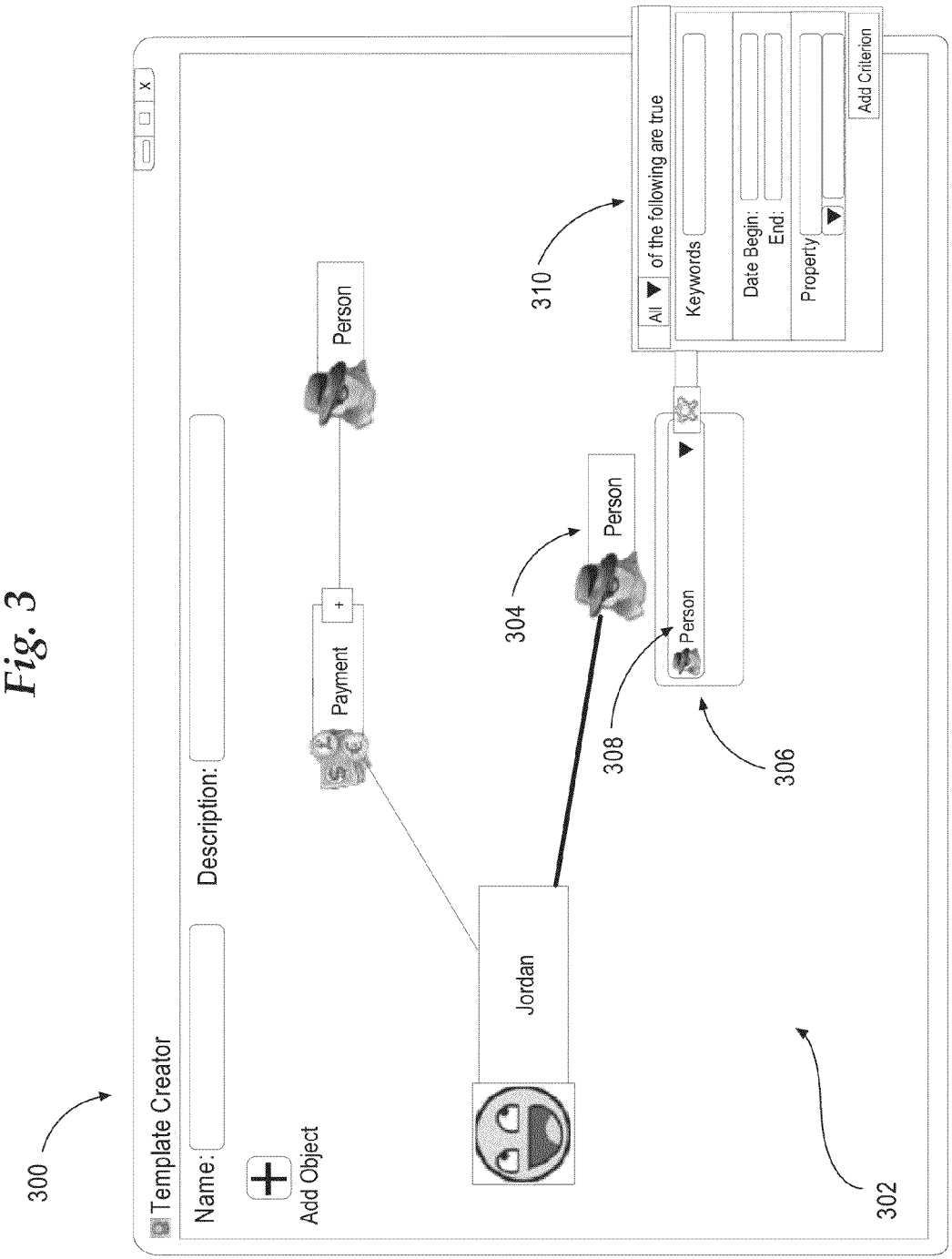
FIG. 3 illustrates an example graphical user interface related to specifying graph node properties.

FIG. 3 illustrates an example user interface 300 that includes graph 302. Graph 302 includes several existing graph nodes and graph edges, including graph node 304 representing a Person data object type. In an embodiment, in response to a user selecting a particular graph node, one or more interface elements may be presented that enable a user to specify one or more of a data object type and data object property values associated with the particular graph node. For example, in response to a user selecting graph node 304, the user may be presented with interface element 306. Interface element 306 includes interface element 308 that enables a user to select a data object type associated with graph node 304.

In an embodiment, in addition to specifying a data object type, a user may specify one or more data object property values using an interface element similar to interface element 310. Interface element 310 comprises a number of form elements that enable a user to specify one or more data object property values. The form elements presented to a user may be based on the particular associated data object type. For example, a user may be presented a particular set of form elements in interface element 310 for a selected Person data object type (e.g., form elements to specify an age, gender, occupation, etc.) and a different set of form elements for an Academic Organization data object type (e.g., form elements to specify an organizational name, location, grade level, etc.). In an embodiment, the data object property form elements associated with a particular data object type may be determined by examining the data object properties stored in association with a particular data object type in a data object under examination.

2.2.3 Data Object Links

In the context of a search around pattern, a data object link represents a connection, event or relationship of two or more data object types. For example, a user may be interested in a particular set of individuals, currency transfers or exchanges of the individuals, bank deposits made by those individuals, and a particular set of bank accounts involved in the bank deposits. In the example, if the individuals are represented in a pattern by a Person data object type, and the bank accounts by a Bank Account data object type, the action of making a bank deposit may be represented by a data object link. In the example, each bank deposit may be represented in a data object collection as a separate data object that "links" particular Person and Bank Account data objects in the collection.

In an embodiment, a data object link is represented in a visual query by a graph edge connecting two graph nodes. Additional information about a data object link may be represented by one or more of a data object link type, object intermediaries, and property matches, each further described herein.

2.2.3.1 Data Object Link Types

In an embodiment, a data object link type specifies a particular type of data object link specified between data objects types. For example, a user specifying a pattern that includes a data object link between two Person data object types may further specify a link type associated with the data object link. In the context of Person data objects, data object link types may include link types representing relationships between individuals, such as "Friend Of," "Neighbor Of," "Colleague Of," etc. Links also may have types of REQUIRED, OPTIONAL, or other attributes to establish Boolean operations between nodes. In an embodiment, relevant data object link types may depend on the particular data object types linked by a data object link.

FIG. 4 illustrates an example graphical user interface 400 including interface elements enabling specification of a data object link type to be associated with a graph edge. Graph 402 includes graph node 404 and graph node 406, each representing a Person data object type. Graph node 404 and graph node 406 are connected by graph edge 408. In an embodiment, in response to a user selecting graph edge 408, a user may be presented with interface element 410 enabling the user to specify a data object link type to be associated with graph edge 408. A user may select a particular link type by selecting a link type option presented in a drop-down list, by searching for a link type in a search box, or any other similar means of selecting a desired link type.

In an embodiment, a list of selectable link types presented to a user in response to selecting a graph edge may be refined based on one or more characteristics of the currently constructed graph. For example, a particular set of link types may be presented based on the data object types and properties associated with the graph nodes connected by the selected graph edge. The particular set of link types may be determined based on the link types that exist between the corresponding data object types in a data object collection under examination.

In an embodiment, the selection of a particular data object link type determines the display of the associated graph edge. For example, in response to a user selecting a particular data object link type, a particular graphic, text, or other indicator may be displayed in conjunction with the associated graph edge to indicate the selected data object link type.

2.2.3.2 Data Object Intermediaries

In an embodiment, a data object link between data object types may be represented by a data object intermediary. A data object intermediary is a type of data object link that is itself represented by a data object type. For example, a user may desire to find instances a Person data object type, a Charity data object type, and a data object link between the two data object types representing a payment transaction occurring between the Person data object type and the Charity data object type. In the example, the data object link between the two data object types may be represented by a Payment transaction data object type that acts as a data object intermediary between the two other data object types. In a data object collection, a data object intermediary may be stored as a data object that includes a reference to each of the associated data objects.

Referring to FIG. 2A, graph 202 illustrates an example of two data object types linked by an object intermediary. Graph 202 includes graph node 204 representing a Person data object type and graph node 218 representing a Charity data object type. Each of graph node 204 and graph node 218 is connected to graph node 206, graph node 206 representing a Payment data object type. In the example graph 202, the Payment data object type represented by graph node 206 acts as an object intermediary to the two other data object types.

Referring to FIG. 4, in an embodiment, a data object link may be specified as an object intermediary by using an interface element similar to interface element 410 used to select a data object link type. For example, using interface element 410, a user may select a data object intermediary in a similar manner to the selection of a data object link type. In response to a user indicating that the link type is an object intermediary, the corresponding graph edge may display an additional graph node between the graph nodes originally connected by the corresponding graph edge. In an embodiment, when a graph including one or more data object intermediaries is transformed into query template, the object intermediaries are represented by a separate data object type and a data object link to each of the connected data object types.

2.2.3.3 Property Matches

In an embodiment, a data object link between data objects types may comprise one or more property matches. A property match specified between two data objects represents one or more data object property values or conditions that both linked data objects must satisfy. For example, in a pattern including two linked Person data object types, a property match may be specified indicating that the Person data object types should have a matching data object property specifying a first name. In the example, a resulting search around on the pattern would return only instances that included data objects having the same first name data object property value.

In an embodiment, a user may specify a property match by selecting a graph edge in a manner similar to the specification of other link properties. For example, in FIG. 4, a user may select graph edge 408 and specify a property match using an interface element with form elements enabling the user to specify the particular values or conditions of the property match.

In an embodiment, a user may specify one or more property matches that specify matches based on approximate, or "fuzzy," matching. Approximate matching includes finding property matches that approximately or substantially match or by specifying a function over one or more data object properties. For example, a user may specify a property match associated with two Person data objects on a property value representing a person's full given name, but specify a function that ignores the person's middle name. In the example, returned result instances would include linked Person data objects that had a same first and a last name, but not necessarily the same middle name.

2.2.3.4 Link Strength

In an embodiment, a user may specify in a graph a link strength associated with one or more data object links between data object types. A link strength may represent, for example, a condition on the number of occurrences of some relationship between two data object types. For example, if two graph nodes representing Person data object types are connected by a graph edge representing a Phone Call data object link, a link strength may be associated with the graph edge specifying a minimum number of phone calls that occurred between two Person data object types. In the example, result instances returned for the specified pattern would include pairs of Person data objects in a data object collection that had initiated at least the minimum number of calls between each pair.

2.2.4 Branching Conditions

Figure 5:
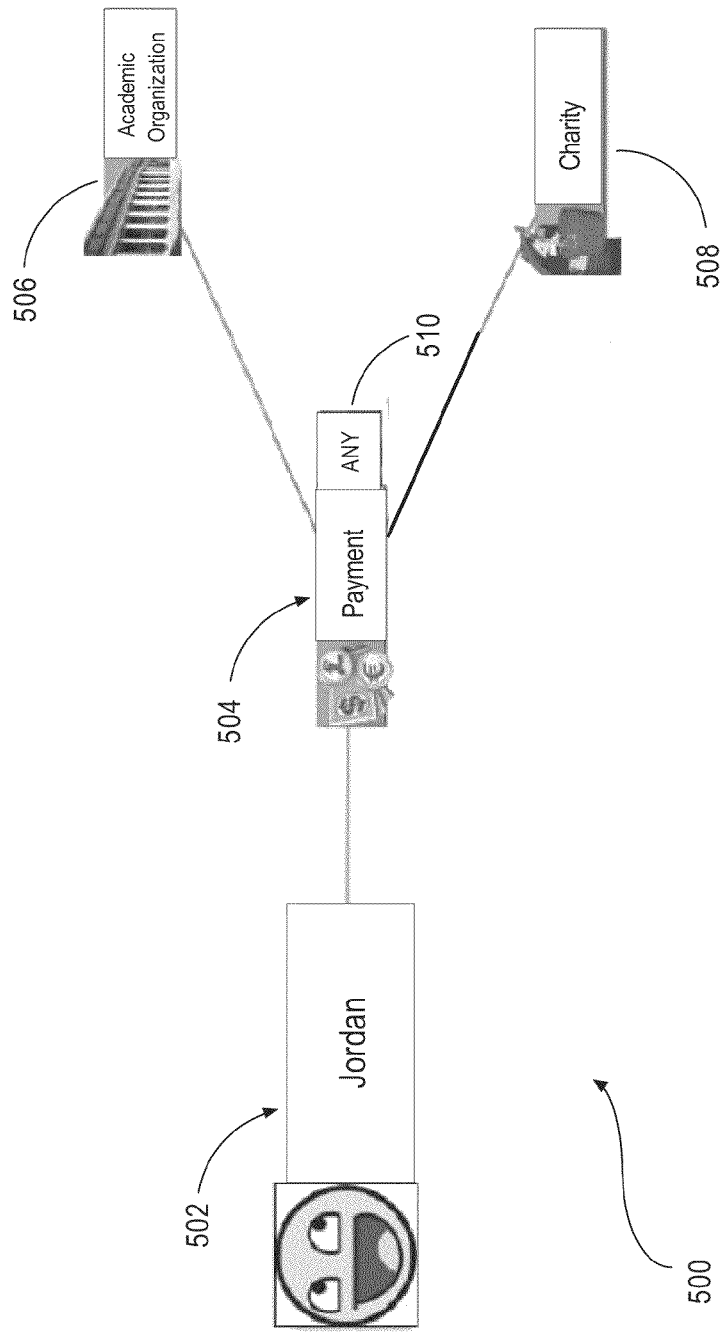
FIG. 5 illustrates an example graphical user interface related to specifying graph branching conditions.

In an embodiment, a user may specify one or more branching conditions in a visual query. For example, a user may desire to specify a pattern corresponding to instances of individuals that made a payment to either an academic organization or a charity. The example pattern may be represented in a visual query by creating a Person, Academic Organization, and Charity data object types, a Payment object intermediary, and specifying a branching condition between the Payment object intermediary and the Academic Organization and Charity data object types. For example, FIG. 5 illustrates an example graph 500 that includes a branching condition corresponding to the above example pattern. Graph node 502 is connected to graph node 504 representing a Payment object intermediary. Graph node 504 is connected to two additional graph nodes, graph node 506 and graph node 508, representing a branching condition corresponding to the pattern described above. The example graph 500 illustrates a branching condition with a branch between two data objects types, however, a branching condition may include more than two data object types.

In an embodiment, a branching condition may represent either a logical conjunction or disjunction between the branches. For example, referring to the example pattern above, a user may desire to find either instances of individuals that made payments to an academic organization OR a charity (represented by a logical disjunction), or to find individuals that made payments to an academic organization AND a charity (represented by a logical conjunction). Interface element 510 illustrates an example interface element enabling a user to select a desired type of branching condition.

In an embodiment, depending on the selected branching condition type, various graphical elements may be displayed to indicate the currently selected branching condition type. For example, interface element 510 may display the word "ANY" to represent a logical disjunction of the linked data object types. In an embodiment, a user may modify a branching condition types by selecting an interface element such as interface element 407. In response to a user changing the branching condition from a logical conjunction to a logical disjunction, interface element 407 may display the word "ALL". Any other graphical elements may be used to indicate the currently selected branching condition type including, for example, icons, text, colors, etc.

In another embodiment, a branching condition may be represented by a separate graph node that is linked by a graph edge to the each of the other graph nodes involved in the branching condition. For example, interface element 510 may be represented by a separate graph node that is connected by an edge to graph node 504, graph node 506, and graph node 508.

2.2.5 Optional and Required Stages

As described above, each level in a query template tree represents a data object link level from an initial data object type in a pattern. In an embodiment, one or more stages of a query template tree may be specified as either optional or required stages. If a particular stage in a query template is specified as a required stage, then any result instance returned by the execution of the query template will include data objects associated with the required link. If a stage is specified as optional, then result instances may or may not include data objects corresponding to the optional stage. In an embodiment, a user may specify one or more graph edges as being associated with either an optional or required stage by, for example, using one or more graphical user interface elements.

Figure 6:
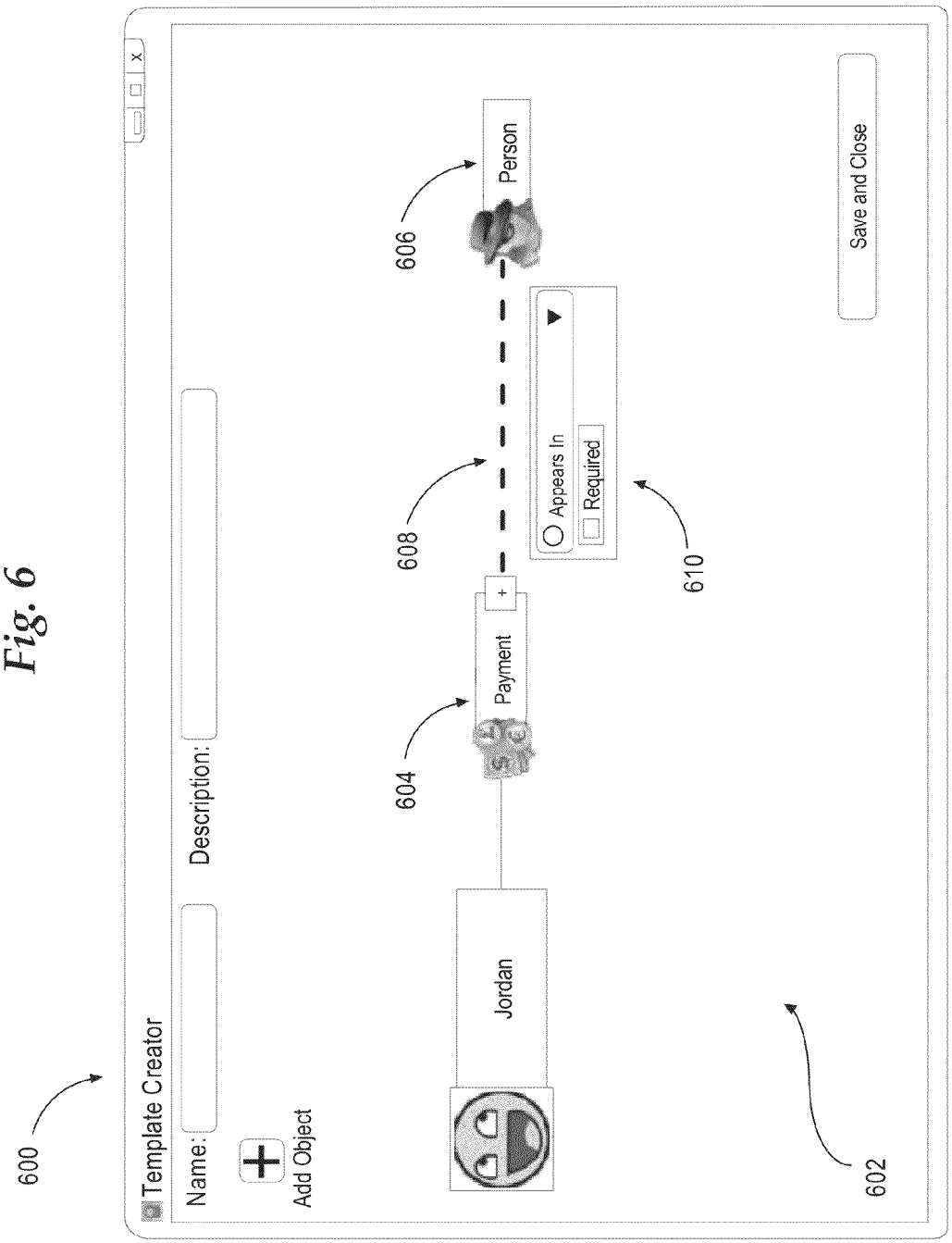
FIG. 6 illustrates an example graphical user interface related to specifying optional and required stages.

FIG. 6 illustrates an example graphical user interface 600 enabling a user to specify graph edges in a visual query as being associated with either optional or required stages. Interface 600 illustrates a graph 602 including graph node 604 and graph node 606, representing a Payment data object type and a Person data object type, respectively. Graph node 604 and graph node 606 are connected by graph edge 608, representing a stage in the query corresponding to graph 602.

Interface element 610 illustrates an example interface element presented to a user in response to the selection of graph edge 608. Interface element 610 includes a check-box that enables a user to indicate whether the select graph edge is associated with an optional or required stage. In an embodiment, the display of the graph edge in a visual query may change depending on whether the graph edge is specified to be associated with an optional or required stage. For example, graph edge 606 is displayed as a dashed line, indicating that the graph edge currently represents an optional stage. If a user changes the link to required, the graph edge may be displayed instead, for example, as a solid line or otherwise visually indicated to be associated with a required stage.

2.2.6 Blank Graph Elements

In an embodiment, a user may specify one or more placeholder graph elements in a visual query, referred to herein as blank graph elements. A blank graph element represents a data object type, data object link type, property value, or other graph element or value of a visual query that a user desires to be supplied at the time an associated query template is executed. For example, a user may create a visual query that includes a graph node representing a Person data object type. A data object property representing a first name associated with the Person data object type may be a value that the user desires to be supplied at the time a query based on the graph is executed. In the example, a user may represent the first name property value associated with the Person data object type with a blank graph element in a constructed visual query.

In an embodiment, when a query template based on a visual query that includes one or more blank graph elements is executed, a user executing the query may be prompted to supply one or more particular values for the one or more blank graph elements. For example, a user may be presented with a graphical form that requests the user to supply particular values for the one or more blank graph elements. Execution of a visual query that includes one or more blank graph elements may result in one or more result instances that include the values supplied by a user for the blank graph elements.

2.2.7 Transforming a Visual Query

In an embodiment, after a user has constructed a visual query corresponding to a desired data object pattern, the user may initiate a search around based on the constructed visual query. For example, a user may use one or more interface elements to initiate the search around on a particular data object collection. In response to a user indicating the initiation of a search around, a data analysis system transforms the constructed visual query into a query template. In general, the transformation of a visual query into a query template comprises generating a textual representation of a pattern described by the visual query graph constructed by a user. The textual representation of the visual query may follow a syntax that is understood by and may be executed by a search around engine in order to return zero or more result instances. In other embodiments, transformation of a visual query may include transformations into other query representations including, but not limited to, a query tree, query execution plans, and/or other textual and non-textual query representations.

Figure 7:
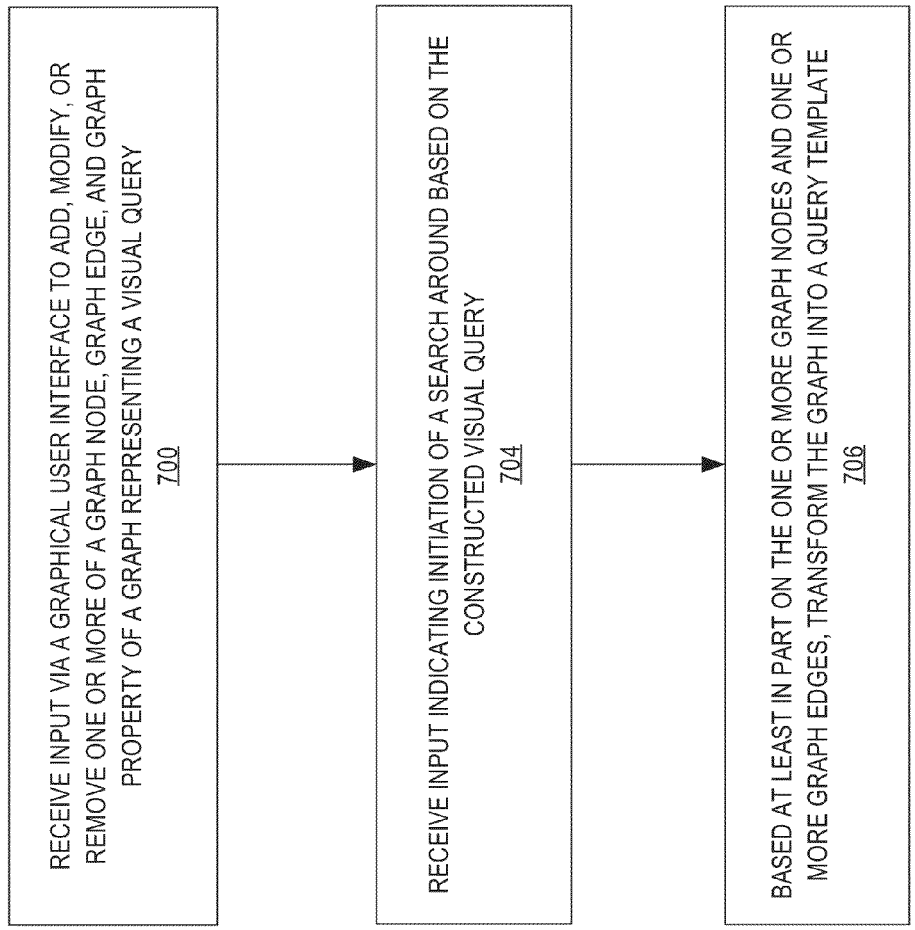
FIG. 7 illustrates an example process flow.

FIG. 7 illustrates an example process flow for the creation and transformation of a visual query according to the embodiments presented herein.

In block 700, the data analysis system 100 receives input via a graphical user interface to add, modify, or remove one or more graph nodes, graph edges, and graph properties of a graph representing a visual query. For example, through interacting with a user at client 120 via graphical user interface 200 illustrated in FIG. 1, the data analysis system 100 may receive one or more input commands to create and modify a visual query graph using one or more graphical user interfaces and techniques described above.

In block 704, the data analysis system 100 receives input indicating the initiation of a search around based on the constructed visual query. For example, data analysis system 100 may receive input via a graphical user interface or other command interface indicating that the user desires to execute a search around based on a constructed visual query graph. In another embodiment, data analysis system 100 may transform a visual query periodically without a user specifically indicating that a visual query transformation should occur, for example, each time a user modifies a visual query graph.

In block 706, the data analysis system 100 transforms a visual query into a query template based at least in part on the one or more graph nodes, one or more graph edges, and associated property values included in the visual query graph. Based on the information associated with the graph elements, an equivalent textual query representation of the pattern described by the graph is generated. For example, a search around engine may start at an initial graph node and iteratively traverse the graph from the initial graph node along associated graph edges, determining the information associated with the graph elements at each step in the graph traversal. In an embodiment, based on any subsequent modifications to a visual query graph by a user, the data analysis system 100 may re-transform a visual query graph into a new query template reflecting the graph modifications.

In an embodiment, transformation of a visual query into a query template may include one or more steps of validation to ensure that the graph represents a valid query. For example, during query transformation, data analysis system 100 may determine whether all graph nodes are connected to at least one other graph node by a graph edge and that each graph edge is connected to two graph nodes. The validity check may include any other determinations to ensure that the user constructed graph represents a valid query according to the rules of the data analysis system 100. In response to determining that one or more rules are not met by a user constructed visual query, one or more error message may be presented to the user.

3.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
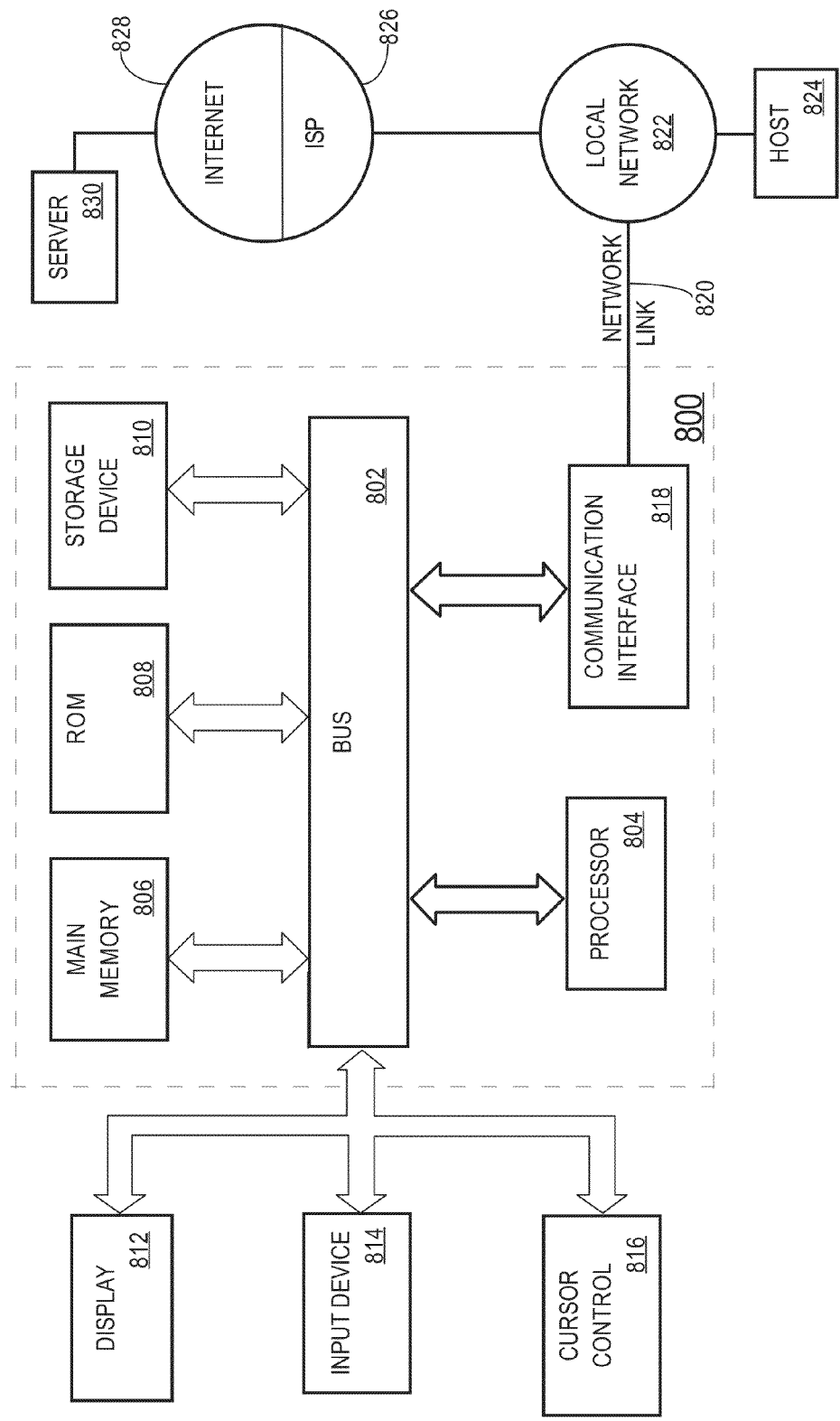
FIG. 8 illustrates a computer system upon which an embodiment may be implemented.

For example, FIG. 8 is a block diagram that illustrates a computer system 800 upon which an embodiment may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    displaying, via a graphical user interface, a graph comprising one or more graph nodes and one or more graph edges,
    receiving input selecting a particular graph edge of the one or more graph edges, wherein the particular graph edge links a first graph node representing a first data object type and a second graph node representing a second data object type;
    using one or more computing devices, in response to receiving the input selecting the particular graph edge of the one or more graph edges, generating a list of one or more selectable data object link types;
    wherein generating the list of the one or more selectable data object link types comprises:
    searching for all instances of a data object pattern in a stored data object collection, the data object pattern including a first data object of the first data object type, a second data object of the second data object type, and one or more data object pattern links;
    determining one or more data object link types of the one or more data object pattern links; and
    populating the list of the one or more selectable data object link types with the one or more data object link types of the one or more data object pattern links;
    causing displaying the list of one or more selectable data object link types wherein the one or more selectable data object link types correspond to the one or more data object link types of the one or more data object pattern links;
    receiving a selection of a particular data object link type of the one or more selectable data object link types;
    receiving input specifying an association between the particular graph edge and a link strength value;
    receiving input via the graphical user interface specifying an association between one or more of the one or more graph edges and an object intermediary;
    transforming the graph to display the first data object type, the second data object type, the particular data object link type, the object intermediary, and the link strength value;
    transforming the graph into a textual representation of the graph, based at least in part on the one or more of the one or more graph edges;
    wherein the textual representation of the graph comprises an Extensible Markup Language (XML) file including one or more XML elements each representing data object types and data object links of one or more graph elements of the graph;
    causing execution, by a database server computer, of one or more database queries based on the textual representation of the graph.

2. The method of claim 1, further comprising receiving input via the graphical user interface to add to the graph: a new graph node, or a new graph edge;
    re-transforming the graph into a second textual representation of the graph based at least on the new graph node, or the new graph edge.

3. The method of claim 1, further comprising receiving input via the graphical user interface selecting a particular graph node of the one or more graph nodes;
  in response to receiving the input selecting the particular graph node of the one or more graph nodes, generating a list of one or more selectable data object types;
  receiving a selection of a particular data object type of the one or more selectable data object types;
  re-transforming the graph into a second textual representation of the graph based at least on the selection of the particular selectable data object type.

4. The method of claim 1, further comprising receiving input via the graphical user interface specifying an association between one or more of the one or more graph edges and one or more of: a link type or a property match;
  re-transforming the graph into a second textual representation of the graph based at least on the one or more of the one or more graph edges.

5. The method of claim 1, further comprising receiving input via the graphical user interface specifying an association between one or more of the one or more graph nodes and one or more data object properties;
  re-transforming the graph into a second textual representation of the graph based at least on the one or more data object properties.

6. The method of claim 1, further comprising receiving input via the graphical user interface specifying a branching condition associated with one or more of the one or more graph nodes, wherein the branching condition represents one of: a logical AND condition, and a logical OR condition;
  re-transforming the graph into a second textual representation of the graph based at least on the branching condition.

7. The method of claim 1, wherein transforming the graph includes identifying, for each of the one or more graph nodes and one or more graph edges, one or more of: an associated data object type, an associated data object link type, one or more associated property values.

8. The method of claim 1, wherein the graph includes one or more blank graph elements, wherein each of the one or more blank graph elements is associated with a value to be supplied by a user when the textual representation of the graph is executed by the database server computer.

9. A non-transitory computer-readable medium storing one or more sequences of instructions, which when executed by one or more processors, cause the one or more processors to carry out the steps of:
  displaying, via a graphical user interface, a graph comprising one or more graph nodes and one or more graph edges,
  receiving input selecting a particular graph edge of the one or more graph edges, wherein the particular graph edge links a first graph node representing a first data object type and a second graph node representing a second data object type;
  using one or more computing devices, in response to receiving the input selecting the particular graph edge of the one or more graph edges, generating a list of one or more selectable data object link types;
  wherein generating the list of the one or more selectable data object link types comprises:
    searching for all instances of a data object pattern in a stored data object collection, the data object pattern including a first data object of the first data object type, a second data object of the second data object type, and one or more data object pattern links;
    determining one or more data object link types of the one or more data object pattern links; and
    populating the list of the one or more selectable data object link types with the one or more data object link types of the one or more data object pattern links;
  causing displaying the list of one or more selectable data object link types wherein the one or more selectable data object link types correspond to the one or more data object link types of the one or more data object pattern links;
  receiving a selection of a particular data object link type of the one or more selectable data object link types;
  receiving input specifying an association between the particular graph edge and a link strength value;
  receiving input via the graphical user interface specifying an association between one or more of the one or more graph edges and an object intermediary;
  transforming the graph to display the first data object type, the second data object type, the particular data object link type, the object intermediary, and the link strength value;
  transforming the graph into a textual representation of the graph, based at least in part on the one or more of the one or more graph edges;
  wherein the textual representation of the graph comprises an Extensible Markup Language (XML) file including one or more XML elements each representing data object types and data object links of one or more graph elements of the graph;
  causing execution, by a database server computer, of one or more database queries based on the textual representation of the graph.

10. The non-transitory computer readable medium of claim 9, further comprising additional instructions which, when executed by the one or more processors, cause receiving input via the graphical user interface to add to the graph: a new graph node, or a new graph edge;
  re-transforming the graph based at least on the new graph node, or the new graph edge.

11. The non-transitory computer readable medium of claim 9, further comprising additional instructions which, when executed by the one or more processors, cause receiving input via the graphical user interface selecting a particular graph node of the one or more graph nodes;
  in response to receiving the input selecting the particular graph node of the one or more graph nodes, generating a list of one or more selectable data object types;
  receiving a selection of a particular data object type of the one or more selectable data object types;
  re-transforming the graph into a second textual representation of the graph based at least on the selection of the particular selectable data object type.

12. The non-transitory computer readable medium of claim 9, further comprising additional instructions which, when executed by the one or more processors, cause receiving input via the graphical user interface specifying an association between one or more of the one or more graph edges and one or more of: a link type or a property match;
  re-transforming the graph into a second textual representation of the graph based at least on the one or more of the one or more graph edges.

13. The non-transitory computer readable medium of claim 9, further comprising additional instructions which, when executed by the one or more processors, cause receiving input via the graphical user interface specifying an association between one or more of the one or more graph nodes and one or more data object properties;

re-transforming the graph into a second textual representation of the graph based at least on the one or more data object properties.

14. The non-transitory computer readable medium of claim 9, further comprising additional instructions which, when executed by the one or more processors, cause receiving input via the graphical user interface specifying a branching condition associated with one or more of the one or more graph nodes, wherein the branching condition represents one of: a logical AND condition, and a logical OR condition;

re-transforming the graph into a second textual representation of the graph based at least on the branching condition.

15. The non-transitory computer readable medium of claim 9, wherein transforming the graph includes identifying, for each of the one or more graph nodes and one or more graph edges, one or more of: an associated data object type, an associated data object link type, one or more associated property values.

16. The non-transitory computer readable medium of claim 9, wherein the graph includes one or more blank graph elements, wherein each of the one or more blank graph elements is associated with a value to be supplied by a user when the textual representation of the graph is executed by the database server computer.

* * * * *